United States Patent
Zhou

(10) Patent No.: US 11,418,290 B2
(45) Date of Patent: Aug. 16, 2022

(54) METHOD AND APPARATUS FOR TRANSMITTING DATA

(71) Applicant: BEIJING XIAOMI MOBILE SOFTWARE CO., LTD., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 166 days.

(21) Appl. No.: 16/690,896

(22) Filed: Nov. 21, 2019

(65) Prior Publication Data

US 2020/0092046 A1 Mar. 19, 2020

Related U.S. Application Data

(63) Continuation of application No. PCT/CN2017/085346, filed on May 22, 2017.

(51) Int. Cl.
*H04L 1/18* (2006.01)
*H04L 1/00* (2006.01)
*H04W 72/04* (2009.01)
*H04W 72/12* (2009.01)

(52) U.S. Cl.
CPC .......... *H04L 1/1809* (2013.01); *H04L 1/0057* (2013.01); *H04L 1/1854* (2013.01); *H04W 72/042* (2013.01); *H04W 72/0413* (2013.01); *H04W 72/1278* (2013.01)

(58) Field of Classification Search
CPC ... H04L 1/1809; H04L 1/0057; H04L 1/1854; H04L 1/1896; H04L 1/1887; H04L 1/0018; H04L 1/18; H04L 5/0053; H04W 72/0413; H04W 72/042; H04W 72/1278
See application file for complete search history.

(56) References Cited

U.S. PATENT DOCUMENTS

| | | | |
|---|---|---|---|
| 8,621,311 B2* | 12/2013 | Tada | H04L 1/1854 714/749 |
| 9,225,477 B1 | 12/2015 | Lee et al. | |
| 9,680,611 B2* | 6/2017 | Yap | H03M 13/6306 |
| 9,722,763 B2* | 8/2017 | Lida | H04L 25/4919 |
| 10,348,466 B2* | 7/2019 | Luo | H04L 5/0055 |

(Continued)

FOREIGN PATENT DOCUMENTS

| | | |
|---|---|---|
| CN | 1946015 A | 4/2007 |
| CN | 101030840 A | 9/2007 |

(Continued)

OTHER PUBLICATIONS

Extended European Search Report of counterpart EP Application No. 17911067.1 dated May 18, 2020, (8p).

(Continued)

*Primary Examiner* — Hanh N Nguyen
(74) *Attorney, Agent, or Firm* — Arch & Lake LLP

(57) ABSTRACT

A method is provided for transmitting data. The method includes: receiving at least one retransmission request, wherein a retransmission request is configured to request retransmission of the erroneous sub-data blocks in the previously transmitted data block; combining the sub-data blocks that need to be retransmitted into a target data block when the sub-data blocks that need to be retransmitted satisfy a predetermined condition; and sending the target data block to a second communication device.

14 Claims, 8 Drawing Sheets

(56) References Cited

U.S. PATENT DOCUMENTS

| | | | |
|---|---|---|---|
| 2009/0154392 A1* | 6/2009 | Park | H04L 1/1845 370/328 |
| 2010/0290400 A1 | 11/2010 | Lee et al. | |
| 2011/0199961 A1 | 8/2011 | Narasimha et al. | |
| 2018/0234881 A1* | 8/2018 | Hosseini | H04W 28/04 |
| 2018/0278454 A1* | 9/2018 | Islam | H04L 27/2655 |

FOREIGN PATENT DOCUMENTS

| CN | 102843227 A | 12/2012 |
|---|---|---|
| CN | 102957511 A | 3/2013 |
| CN | 103580826 A | 2/2014 |
| CN | 104683073 A | 6/2015 |
| CN | 106656435 A | 5/2017 |

OTHER PUBLICATIONS

Mediatek Inc, "Discussion on CB grouping principles for CBG-based transmission with single/multi-bit HARQ-ACK feedback" 3GPP Draft; R1-1707851, vol. RAN WG1, Meeting #89 Hangzhou, China, May 15, 2017, (6p).

Samsung, "CBG Construction" 3GPP Draft; R1-1708032, vol. RAN WG1, Meeting #89, Hangzhou, China, May 15, 2017, (4p).

First Office Action of Chinese Application No. 201780000358.6 dated Oct. 23, 2020 with English translation, (36p).

International Search Report of PCT Application No. PCT/CN2017/085346 dated Dec. 27, 2017 with English translation, (12p).

Examination Report of counterpart Indian Application No. 201927050881 dated Mar. 4, 2021, (5p).

Notification to grant patent right for invention of Chinese Application No. 201780000358.6 dated Jun. 3, 2021, (6p).

Samsung, CB—group based retransmission for eMBB; 3GPP TSG RAN WG1 Meeting #88 R1-1702990; Feb. 17, 2017, (9p).

Samsung, Discussion on partial retransmission for eMBB; 3GPP TSG RAN WG1 Meeting NR#1 R1-1700959; Feb. 20, 2017, (4p).

* cited by examiner

METHOD AND APPARATUS FOR TRANSMITTING DATA

CROSS-REFERENCE

This application is a continuation of International Application No. PCT/CN2017/085346 filed on PCT in May 22, 2017, the contents of all of which are incorporated herein by reference in their entirety.

TECHNICAL FIELD

The present disclosure relates to the technical field of communications, and in particular, relates to a method and apparatus for transmitting data.

BACKGROUND

With developments of communication technologies, some aspects, such as data transmission rate, data transmission latency, and the like, have been improved in varying degrees. However, erroneous data may inevitably occur during transmission, for example, data being damaged or lost. In order to receive correct data, a receiver may request a sender to retransmit the data.

SUMMARY

In a first aspect, a method for transmitting data is provided. The method is applied to a first communication device, and the method includes: receiving at least one retransmission request which is configured to request retransmission of the erroneous sub-data blocks in the previously transmitted data block; combining the sub-data blocks that need to be retransmitted into a target data block when the sub-data blocks that need to be retransmitted meet a predetermined condition; and sending the target data block to a second communication device.

In a second aspect, an apparatus is provided for transmitting data. The apparatus may include a processor; and a memory for storing instructions executable by the processor. The processor is configured to: receive at least one retransmission request, wherein one retransmission request is configured to request retransmission of the erroneous sub-data blocks in the previously transmitted data block; combine the sub-data blocks that need to be retransmitted into a target data block when the sub-data blocks that need to be retransmitted meet a predetermined condition; and send the target data block to a second communication device.

In a third aspect, an apparatus is provided for transmitting data. The apparatus may include a processor and a memory for storing processor executable instructions. The processor is configured to: send a retransmission request to a first communication device, wherein the retransmission request is configured to request retransmission of the erroneous sub-data blocks in the previously transmitted data block; receive a target data block, wherein the target data block is obtained by the first communication device combining the sub-data blocks that need to be retransmitted when the sub-data blocks meet a predetermined condition; and acquire, from the target data block, the sub-data blocks that the second communication device requests to retransmit.

It is to be understood that both the foregoing general description and the following detailed description are exemplary and explanatory only and are not intended to limit the present disclosure.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

Figure 1:
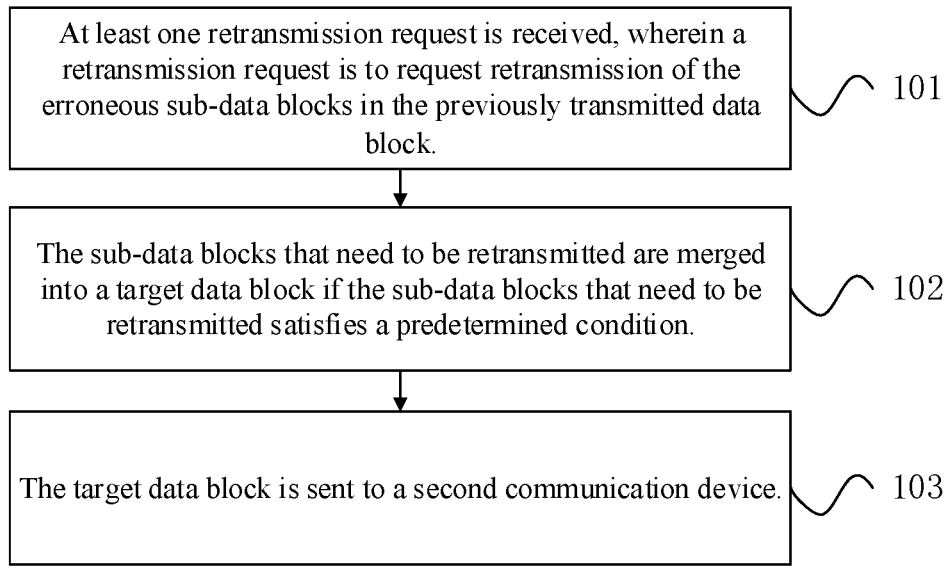
FIG. 1 is a flowchart of a method for transmitting data according to one or more embodiments of the present disclosure.

The present disclosure will be described in further detail with reference to the accompanying drawings, to present the objects, technical solutions, and advantages of the present disclosure more clearly.

In the accompanying drawings, various embodiments of the present disclosure are illustrated in block diagrams, flow charts and other diagrams. Each block in the flowcharts or blocks may represent a module, a program, or a part of code, which contains one or more exe curable instructions for performing specified logic functions, and in the present disclosure, a dispensable block is illustrated in a dotted line. Besides, although these blocks are illustrated in particular sequences for performing the steps of the methods, as a matter of fact, they may n of necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

It shall be understood that, although the terms "first" and "second" etc. may be use d herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

During data transmission, taking a scenario where a base station transmits data to a user equipment (UE) as an example, when the UE receives a data block from the base station, the UE may parse the data block. If parsing fails, it indicates that the erroneous data blocks occurred during the transmission. Since the erroneous data block is unusable, the UE may send a retransmission request to the base station. Upon receiving the retransmission request, the base station may retransmit the data block requested by the UE to the UE.

In fact, the erroneous data block generally includes a part of incorrect data and another part of correct data. However, the direct request to retransmit the erroneous data block may not accurately retransmit the erroneous data, and thus retransmission accuracy is poor.

Various embodiments of the present disclosure provide a method and apparatus for transmitting data. The specific technical solutions are as follows:

FIG. 1 is a flowchart of a method for transmitting data according to embodiments of the present disclosure. As illustrated in FIG. 1, the embodiments may be applied to a first communication device, and may include the following steps:

In step 101, at least one retransmission request is received, wherein a retransmission request is to request retransmission of the erroneous sub-data blocks in the previously transmitted data block. Here, an erroneous sub-data block may refer to any sub-data block with an error detected by a receiving device. The first communication device may be a base station.

In step 102, the sub-data blocks that need to be retransmitted are combined into a target data block if the sub-data blocks that need to be retransmitted meets a predetermined condition.

In step 103, the target data block is sent to a second communication device. The second communication device may be a user equipment.

According to the embodiments of the present disclosure, at least one retransmission request is received, and a target data block, after being combined with the sub-data blocks, is sent to a second communication device if the sub-data blocks that need to be retransmitted meet a predetermined condition. Since the sub-data block has fewer data units compared with the data block, erroneous data in the data block may be more accurately transmitted, and thus retransmission accuracy is improved. Meanwhile the combined sub-data blocks are retransmitted in the form of the target data block, so that more data may be transmitted over an allocated transmission resource, not only the occupation of the transmission resources is saved, but also more data may be transmitted over the transmission resources at one time, thereby improving data transmission efficiency.

In some embodiments, the sub-data blocks that need to be retransmitted are combined into a target data block if the sub-data blocks that need to be retransmitted meets a predetermined condition, including:

if the number of sub-data blocks that need to be transmitted equals to a first value, the first value sub-data blocks are combined into a target data block.

In a possible implementation manner, the sub-data blocks that need to be retransmitted are combined into a target data block if the sub-data blocks that need to be retransmitted meets a predetermined condition, including:

based on a service type of each sub-data block that needs to be retransmitted, if the number of sub-data blocks whose service type is a target service type reaches a second value, the sub-data blocks that need to be retransmitted are combined into a target data block.

In some embodiments, the service type is ultra reliable low latency communication (URLLC), enhanced Mobile Broad Band (eMBB), or massive machine type communication (mMTC).

In some embodiments, the target data block carries a sub-data block identifier of each sub-data block.

In some embodiments, the first communication device is a base station, and the second communication device is a UE, and prior to sending the target data block to a second communication device, the method further includes:

sending transmission indication information to the UE over a downlink transmission resource scheduled for the UE, wherein the transmission indication information is used to indicate the number and size of the sub-data blocks in the target data block.

In some embodiments, the first communication device is a UE, and the second communication device is a base station, and prior to sending the target data block to a second communication device, the method further includes:

sending a scheduling request to the base station, where the scheduling request is used to request scheduling an uplink transmission resource for the UE; and sending transmission indication information to the UE over the uplink transmission resource, wherein the transmission indication information is used to indicate the number and size of the sub-data blocks in the target data block.

In some embodiments, upon receiving at least one retransmission request, the method further includes: determining a configured retransmission mode; sending the sub-data block corresponding to each retransmission request to the second communication device corresponding to the retransmission request respectively if the retransmission mode is a first transmission mode. Combining the sub-data blocks that need to be retransmitted into a target data block if the sub-data block that needs to be retransmitted meet a predetermined condition includes: combining the sub-data blocks that need to be retransmitted into a target data block if the retransmission mode is a second retransmission mode and the sub-data blocks that need to be retransmitted meet a predetermined condition.

In some embodiments, the first communication device is a UE, the second communication device is a base station, the retransmission mode is configured by a physical downlink control channel (PDCCH) signaling, or the retransmission mode is configured by a radio resource control (RRC) signaling, or the retransmission mode is configured by a broadcast signaling.

Any of the above optional technical solutions may be combined to form the optional embodiments of the present disclosure, which will not be described herein any further.

Figure 2:
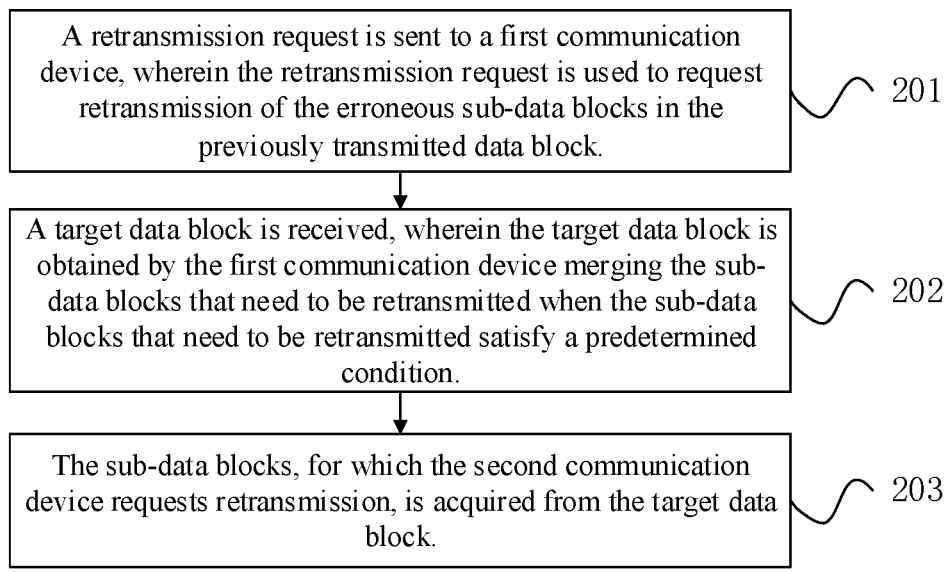
FIG. 2 is a flowchart of a method for transmitting data according to one or more embodiments of the present disclosure.

FIG. 2 is a flowchart of a method for transmitting data according to embodiments of the present disclosure. As illustrated in FIG. 2, the embodiments may be applied to a second communication device, and may include the following steps:

In step 201, a retransmission request is sent to a first communication device, wherein the retransmission request is configured to request retransmission of the erroneous sub-data blocks in the previously transmitted data block.

In step 202, a target data block is received, wherein the target data block is obtained by the first communication device combining the sub-data blocks that need to be retransmitted when the sub-data blocks that need to be retransmitted meet a predetermined condition.

In step 203, the sub-data blocks, for which the second communication device requests retransmission, is acquired from the target data block.

According to the present disclosure, at least one retransmission request is received, and a target data block, after being combined with the sub-data blocks, is sent to a second communication device when the sub-data blocks that need to be retransmitted meet a predetermined condition. Since the sub-data block has fewer data units compared with the data block, the erroneous data in the data block may be more accurately transmitted, and thus retransmission accuracy is improved. Meanwhile the combined sub-data blocks are retransmitted in the form of the target data block, so that more data may be transmitted over an allocated transmission resource, not only the occupation of the transmission resources is saved, but also more data may be transmitted over the transmission resources at one time, thereby improving data transmission efficiency.

Figure 3:
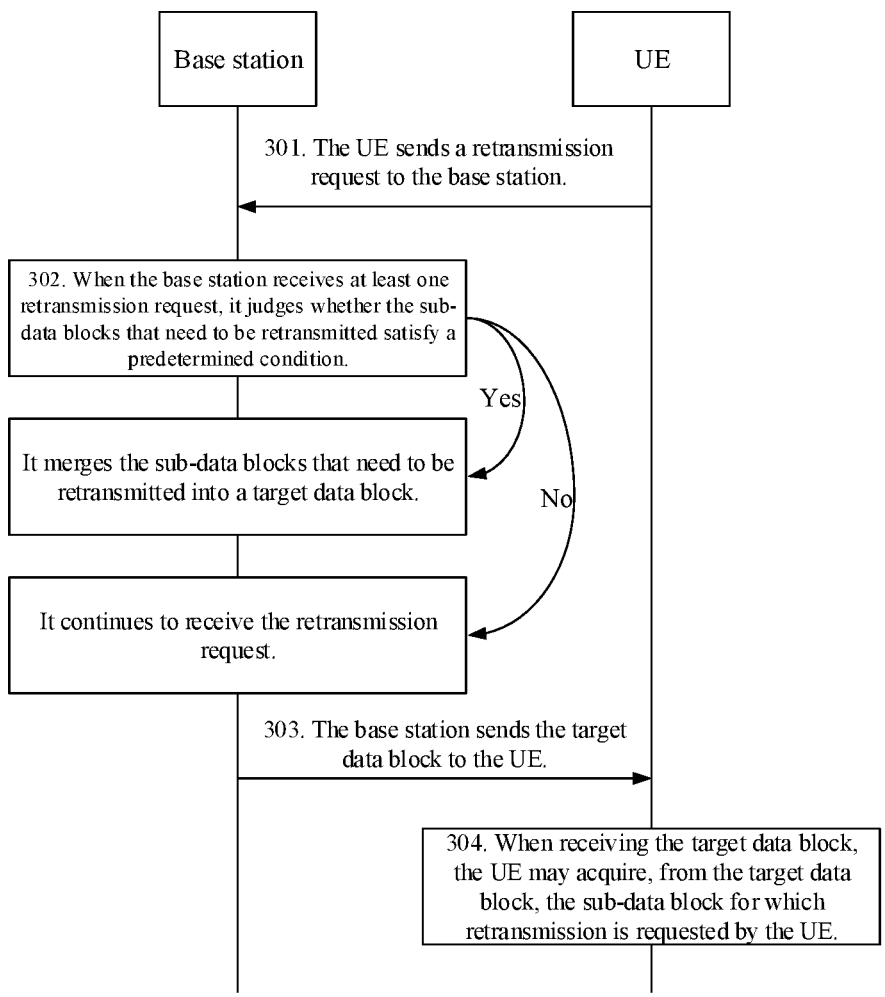
FIG. 3 is a flowchart of a method for transmitting data according to one or more embodiments of the present disclosure.

FIG. 3 is a flowchart of a method for transmitting data according to embodiments of the present disclosure. As illustrated in FIG. 3, the method according to the embodiments may be applied to an interaction process between a base station and a UE, and may include the following steps:

In step 301, the UE sends a retransmission request to the base station, wherein the retransmission request is configured to request retransmission of erroneous sub-data block in the previously transmitted data block.

Here, a data block refers to the data transmitted in a data transmission process. The data block may be constituted of sub-data blocks having fewer data units than the data block. The embodiments of the present disclosure set no limitation to the specific data unit of the data block or the sub-data block. For example, a data block may be a transport block (TB), and a sub-data block may be a code block group (CBG).

Figure 4:
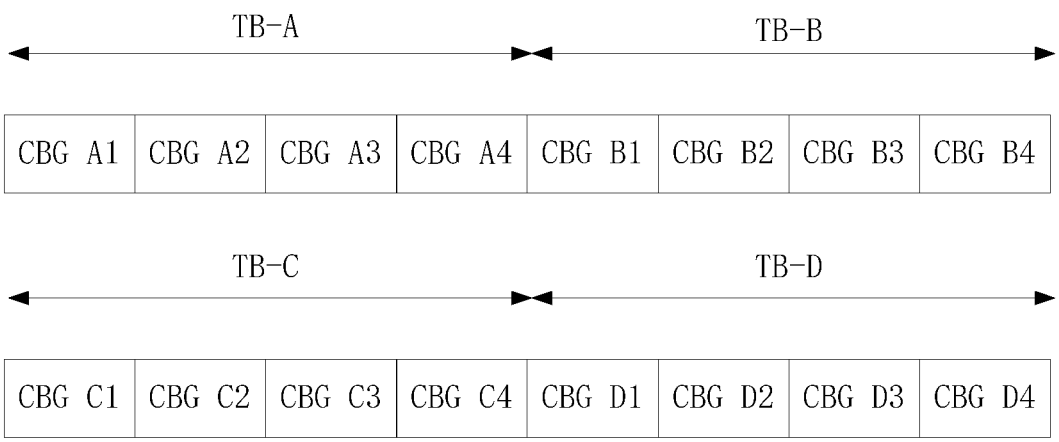
FIG. 4 is a schematic diagram of a sub-data block according to one or more embodiments of the present disclosure.

Since an erroneous sub-data block occurs in the previous data block transmission process between the UE and the base station, the UE fails to parse the data in the sub-data block when parsing each sub-data block in the data block received in the previous transmission process. Therefore, a retransmission request may be generated based on a sub-data block identifier of the sub-data block, and the retransmission request may be sent to the base station. The sub-data block identifier is used for uniquely identifying a sub-data block and the sub-data block identifier may be expressed in a plurality of forms. For example, the sub-data block identifier is represented by a data block identifier of the data block where the sub-data block is located and a serial number of the data block where the sub-data block is located. Referring to FIG. 4, a schematic diagram of a sub-data block is shown according to embodiments of the present disclosure. In the schematic diagram, the UE has received four data blocks, that is, TB-A, TB-B, TB-C and TB-D. Each TB may be constituted of four CBGs. Assuming that parsing the first CBG in the TB-D fails, the UE may take "D1" as the sub-data block identifier of the CBG, generate a retransmission request, and send the retransmission request to the base station.

By requesting retransmission of the erroneous sub-data blocks, the UE may directly use the other sub-data blocks in the retained data block, and wait for a sub-data block having a very small amount of data to be received. Since the correct sub-data blocks in the data block do not need be requested to be retransmitted and the UE may directly use them after parsing, data utilization rate of the UE is improved, and occupation of transmission resources is reduced.

In step 302, when the base station receives at least one retransmission request, it determines whether the sub-data blocks that need to be retransmitted meet a predetermined condition; if yes, it combines the sub-data blocks that need to be retransmitted into a target data block; if no, it continues to receive the retransmission request.

Here, the sub-data blocks that need to be retransmitted refers to the erroneous sub-data blocks in the previously transmitted data block, a retransmission request from one UE, and a plurality of retransmission requests may be respectively from different UEs. Since data in the sub-data block has fewer data units compared with the data block, to save the transmission resources, upon receiving at least one retransmission request within each transmission time slot, the base station may not directly respond to each of the at least one retransmission request, but may determine whether the sub-data blocks that need to be retransmitted meet the predetermined condition based on the at least one retransmission request. If yes, the base station combines the sub-data blocks that need to be retransmitted into a target data block; if no, it continues to receive the retransmission request within a next transmission time slot until the sub-data blocks that need to be retransmitted meet the predetermined condition.

The embodiments of the present disclosure set no limitation to the predetermined condition. For example, the predetermined condition may be defined based on the number of sub-data blocks, or defined based on the number of sub-data blocks and a service type. Correspondingly, the base station may employ at least two judgment modes as follows:

Judgment mode 1: The base station determines whether the number of sub-data blocks that need to be retransmitted reaches a first value; if yes, the base station combines the first value sub-data blocks into a target data block; if no, it continues to receive the retransmission request.

In the judgment mode 1, the base station may extract a sub-data block identifier from the retransmission request within each transmission time slot, determine the number of sub-data block identifiers, determine the number of sub-data block identifiers as the number of sub-data blocks that need to be transmitted, and further determine whether the number reaches the first value. If the number reaches the first value, it indicates that the sub-data blocks that need to be retransmitted meet the predetermined condition, and the sub-data blocks corresponding to the sub-data block identifiers are acquired based on the sub-data block identifiers, and the first value acquired sub-data blocks are combined into a target data block. If the number does not reach the first value, it indicates that the sub-data blocks that need to be retransmitted do not meet the predetermined condition yet, and the base station may continue to receive a retransmission request within a next transmission time slot until the number of sub-data blocks that need to be retransmitted reaches the first value. Of course, if a sub-data block has been retransmitted, unless the erroneous sub-data blocks still occur during transmission and the base station receives the retransmission request for the sub-data blocks, the sub-data block are not counted as the sub-data blocks that need to be retransmitted.

Figure 5:
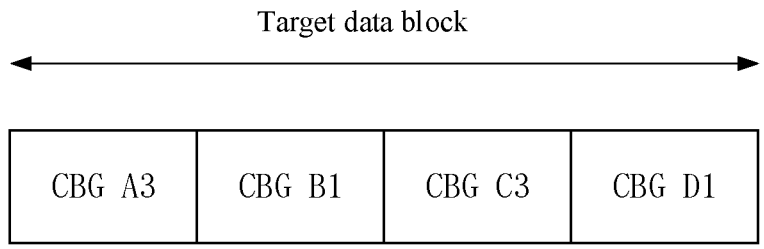
FIG. 5 is a schematic diagram of a target data block according to one or more embodiments of the present disclosure.

In fact, since a plurality of sub-data blocks that are combined may be desired by different UEs, in order for each UE to highly efficiently acquire its desired sub-data blocks from the target data block, the target data block may carry the sub-data block identifier of each sub-data block. In this case, the base station, when combining the sub-data blocks, may correspondingly add the sub-data block identifier of the sub-data block that needs to be retransmitted. The embodiments of the present disclosure set no limitation to how to define the sub-data block identifiers. For example, the sub-data block identifier may be set at the previous position of its corresponding sub-data block. For another example, the sub-data block identifier may be set at the next position of its corresponding sub-data block. For another example, the sub-data block identifiers of the sub-data blocks may be sequenced based on the sequence of the sub-data blocks, and the sequenced sub-data block identifiers may be added before or after the sequenced sub-data blocks. Referring to FIG. 5, a schematic diagram of a target data block is shown according to embodiments of the present disclosure. In this schematic diagram, the sub-data blocks that need to be retransmitted are respectively a CBG with a sub-data block identifier A3, a CBG with a sub-data block identifier B1, a CBG with a sub-data block identifier C3, and a CBG with a sub-data block identifier D1, and the sub-data block identifier is set at the next position of its corresponding CBG.

By judging whether the number of sub-data blocks that need to be transmitted reaches the first value, the data amount in each retransmission may reach a specific data amount, that is, a plurality of sub-data blocks may be transmitted in one retransmission, and only one transmission resource needs to be allocated to the plurality of sub-data blocks, such that occupation of the transmission resources is reduced.

Judgment mode 2: Based on the service type of each sub-data block that needs to be retransmitted, the base station determines whether the number of sub-data blocks whose service type is a target service type reaches a second value; if yes, the base station combines all these sub-data blocks that need to be retransmitted into a target data block; and if no, the base station continues to receive the retransmission request.

In a practical application scenario, each data block that the base station and the UE interact with may correspond to a service type, and the base station may determine a transmission priority or a transmission resource or the like based on the service type of a data block to be transmitted. The embodiments of the present disclosure sets no limitation to division of the service types. For example, in accordance with the requirements imposed by services onto the transmission latency, the services may be categorized into ultra reliable low latency communication (URLLC), enhanced mobile broad band (eMBB), or massive machine type communication (mMTC). These three service types are arranged in descending order of transmission latency. For example, the URLLC requires a transmission latency that is less than a first time duration, the eMBB requires a transmission latency that is less than a second time duration, and the mMTC requires a transmission latency that is less than a third time duration, wherein the first time duration is less than the second time duration, and the second time length is less than the third time duration. The target service type refers to a service type that has been defined to trigger the retransmission.

The base station may determine, based on the sub-data block identifier carried in each retransmission request, the sub-data blocks that need to be retransmitted, that is, the sub-data blocks previously transmitted. Since the service type has been determined in the previous transmission, the base station may directly acquire the service type of the sub-data blocks previously transmitted, further determine the number of sub-data blocks whose service type is the target service type, and determine whether the number of sub-data blocks reaches the second value. If yes, the base station combines the sub-data blocks corresponding to the at least one transmission request; if no, the base station continues to receive the retransmission request until the number of sub-data blocks whose service type is the target service type in the sub-data blocks that need to be transmitted reaches the second value.

Figure 6A:
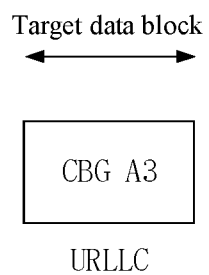
FIG. 6A is a schematic diagram of a target data block according to one or more embodiments of the present disclosure.

Taking a scenario where the target service type is the URLLC as an example, in order to meet the higher requirement imposed by the URLLC on the transmission latency, and enable the UE to receive the sub-data block within the required transmission latency, the second value corresponding to the URLLC may be defined, for example, the second value may be defined as 1. That is, each time when a sub-data block whose service type is the URLLC is received, a process of combining the sub-data blocks may be triggered, and the sub-data block may be retransmitted to the UE. Referring to FIG. 6A, a schematic diagram of a target data block according to embodiments is shown. The target data block is constituted of one sub-data block whose service type is the URLLC. The base station receives a retransmission request for a sub-data block with a sub-data block identifier A3 within a transmission time slot, and further determines that the service type of the sub-data block is the URLLC and the second value is reached. Afterwards, the base station combines the sub-data blocks and the sub-data block identifier of the sub-data blocks into a target data block.

Figure 6B:
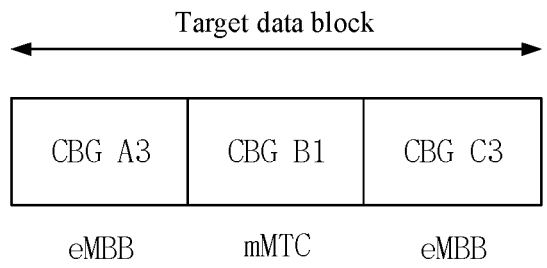
FIG. 6B is a schematic diagram of a target data block according to one or more embodiments of the present disclosure.

Taking a scenario where the target service type is the eMBB as an example, since the eMBB has a specific requirement on the transmission latency, in order to not only enable the UE to receive the sub-data blocks within the required transmission latency, but also transmit more sub-data blocks at one time, thereby saving the transmission resources, the second value corresponding to the eMBB may be defined, for example, the second value may be defined as 2. Referring to FIG. 6B, a schematic diagram of a target data block according to embodiments is shown. The target data block is constituted of two sub-data blocks whose service type is the eMBB and one sub-data block whose service type is the mMTC. The base station receives a retransmission request for the three sub-data blocks within a transmission time slot, and further determines that the number of sub-data blocks whose service type is the eMBB reaches the second value. Afterwards, the base station combines these three sub-data blocks and the corresponding sub-data block identifiers into a target data block.

Figure 6C:
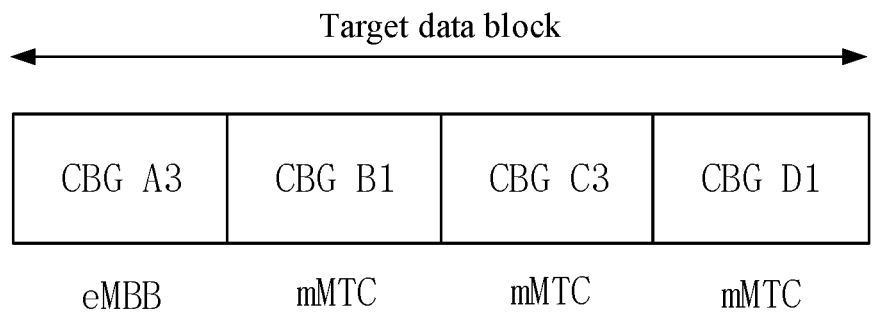
FIG. 6C is a schematic diagram of a target data block according to one or more embodiments of the present disclosure.

Of course, the target service type may also be a combination of a variety of service types. The embodiments of the present disclosure set no limitation to the combination. Taking a scenario where the target service type is a combination of the mMTC and the eMBB as an example, since neither the mMTC nor the eMBB imposes a high requirement on the transmission latency, in order to transmit more sub-data blocks at one time and save the transmission resources, the second value corresponding to the mMTC and the eMBB may be defined, for example, the second value may be defined as 4. That is, when the total number of sub-data blocks whose service types are the mMTC the eMBB reaches 4, the combining process may be performed. Referring to FIG. 6C, a schematic diagram of a target data block according to embodiments is shown. The target data block is constituted of three sub-data blocks whose service type is the nMTC and one sub-data block whose service type is the eMBB.

In step 303, the base station sends the target data block to the UE.

For example, the base station determines the UE receiving the target data block based on the sub-data block identifier, and sends the target data block to the determined UE over a transmission resource that both the base station and the UE agree on. Here, there are a plurality of ways to agree on the transmission resource. For example, the base station temporarily schedules a transmission resource for the UE, or a transmission resource has been pre-configured on the UE side.

In a practical application scenario, considering that the sub-data block of each service type may have a different size, therefore, in order to enable the UE to determine the sub-data blocks from the target data block, prior to sending the target data block, the base station may send transmission indication information to the UE over a downlink transmission resource scheduled for the UE, wherein the transmission indication information indicates the number and size of sub-data blocks in the target data block, so that the UE may determine the sub-data blocks from the target data block and acquire the sub-data blocks thereof based on the transmission indication information. Of course, in order to reduce the amount of data that needs to be transmitted, the size of the sub-data blocks of each service type may be pre-configured on the UE, and the transmission indication information is used to only indicate the number of sub-data blocks in the target data block. Here, the base station may schedule the downlink transmission resource for the UE in a plurality of ways. For example, the base station performs scheduling by a PDCCH (Physical Downlink Control Channel) signaling, or by an RRC (Radio Resource Control) signaling, or by a broadcast signaling. Here, the PDCCH signaling has a transmission cycle shorter than a transmission cycle of the RRC signaling, and the transmission cycle of the RRC signaling is shorter than a transmission cycle of the broadcast signaling. Therefore, the base stations may determine a signaling employed for scheduling the downlink transmission resource based on the service type of the sub-data blocks in the target data block. For example, when the target data block includes the sub-data blocks whose service type is the URLLC, the base station may determine that the PDCCH signaling having a smaller transmission cycle is employed for scheduling the downlink transmission resource, such that the UE may acquire the sub-data block within a shorter transmission latency.

It should be noted that the base station may determine a configured retransmission mode after step 301. If the retransmission mode is a first retransmission mode, the base station sends the sub-data block corresponding to each retransmission request to the second communication device corresponding to the retransmission request; and if the retransmission mode is a second retransmission mode, step 302 is performed.

Here, the first retransmission mode is used to indicate that a sub-data block is separately transmitted in a retransmission process, and the second retransmission mode is used to indicate that the target data block combined with the sub-data blocks in a retransmission process. In the above process of determining the retransmission mode, the base station may read configuration indication information indicating the retransmission mode. If the configuration indication information is the first configuration information (for example, the bit of the configuration indication information is 0), it is determined that the retransmission mode is the first retransmission mode, and a transmission resource is scheduled for each sub-data block that needs to be retransmitted, the sub-data block corresponding to the sub-data block identifier is acquired based on the sub-data block identifier carried in the retransmission request, and the sub-data block corresponding to the previous retransmission request is sent to the UE corresponding to the retransmission request over the scheduled transmission resource. Of course, if the configuration indication information is the second configuration indication information (for example, the bit of the configuration indication information is 1), the base station may determine that the retransmission mode is the second retransmission mode, and step 302 is performed. By determining the configured retransmission mode, retransmission may be carried out based on the configured retransmission mode such that the transmission mode can be diversified. In addition, regardless of which retransmission mode is configured, retransmission may be carried out based on the erroneous sub-data blocks in the data block. Therefore, erroneous data in the data block may be more accurately transmitted, and retransmission accuracy is improved.

In a practical application scenario, the base station may also update the configured retransmission mode based on the current operation policy. The embodiments of the present disclosure set no limitation to the method for updating the retransmission mode. For example, the base station configures the first retransmission mode within the first time period, and configures the second retransmission mode within the second time period. The first time period may be the off-peak hours for the transmission resources, for example, early morning in a day, and the second time period is the peak hours for transmission resources, for example, the working hours in a day. For another example, the base station may also update the configured retransmission mode based on a received configuration instruction, wherein the configuration instruction may be triggered by an operator. By the above at least two ways for updating the retransmission mode, the base station may flexibly and dynamically configure the current retransmission mode, such that the retransmission mode is more in line with the real-time data transmission requirements.

In step 304, when receiving the target data block, the UE may acquire, from the target data block, the sub-data block for which retransmission is requested by the UE.

For example, the UE may perform a blind detection for the target data block, parse each sub-data block in the target data block based on the allocated parsing parameters when accessing the base station, and verify the data parsed from each sub-data block. If the verification fails, it indicates that the sub-data block is not the one for which retransmission is requested by the UE, and the UE continues to parse the other sub-data blocks. If the verification is successful, it indicates that the data block is the one for which retransmission is requested by the UE, and the UE acquires the data in the sub-data block. By the blind detection, information such as the sub-data block identifier or the like does not need to be configured, such that the amount of data that needs to be transmitted is reduced, and the transmission load is mitigated.

Of course, the UE may also acquire the sub-data block based on the received transmission indication information. For example, the UE may determine the construction of the sub-data blocks in the target data based on the number and size of the sub-data blocks indicated in the transmission indication information, and parse the determined sub-data blocks, such that when the sizes of the sub-data blocks of various service types are different, the UE may still successfully acquire the desired sub-data blocks.

In fact, in the case where each sub-data block included in the target data block carries the sub-data block identifier of the sub-data block, the UE may, based on the sub-data block identifier of the sub-data block for which retransmission is requested, directly acquire the sub-data block corresponding to the sub-data block identifier from the target data block. In this way, the efficiency of acquiring the sub-data block by the UE is improved.

According to the embodiments of the present disclosure, at least one retransmission request is received, and a target data block, after being combined with the sub-data blocks, is sent to a second communication device if the sub-data blocks that need to be retransmitted meet a predetermined condition. Since the sub-data block has fewer data units compared with the data block, the erroneous data in the data block may be more accurately transmitted, and thus retransmission accuracy is improved. Meanwhile, the combined sub-data blocks are retransmitted in the form of the target data block, so that more data may be transmitted over an allocated transmission resource, not only the occupation of the transmission resources is saved, but also more data may be transmitted over the transmission resources at one time, thereby improving data transmission efficiency.

Figure 7:
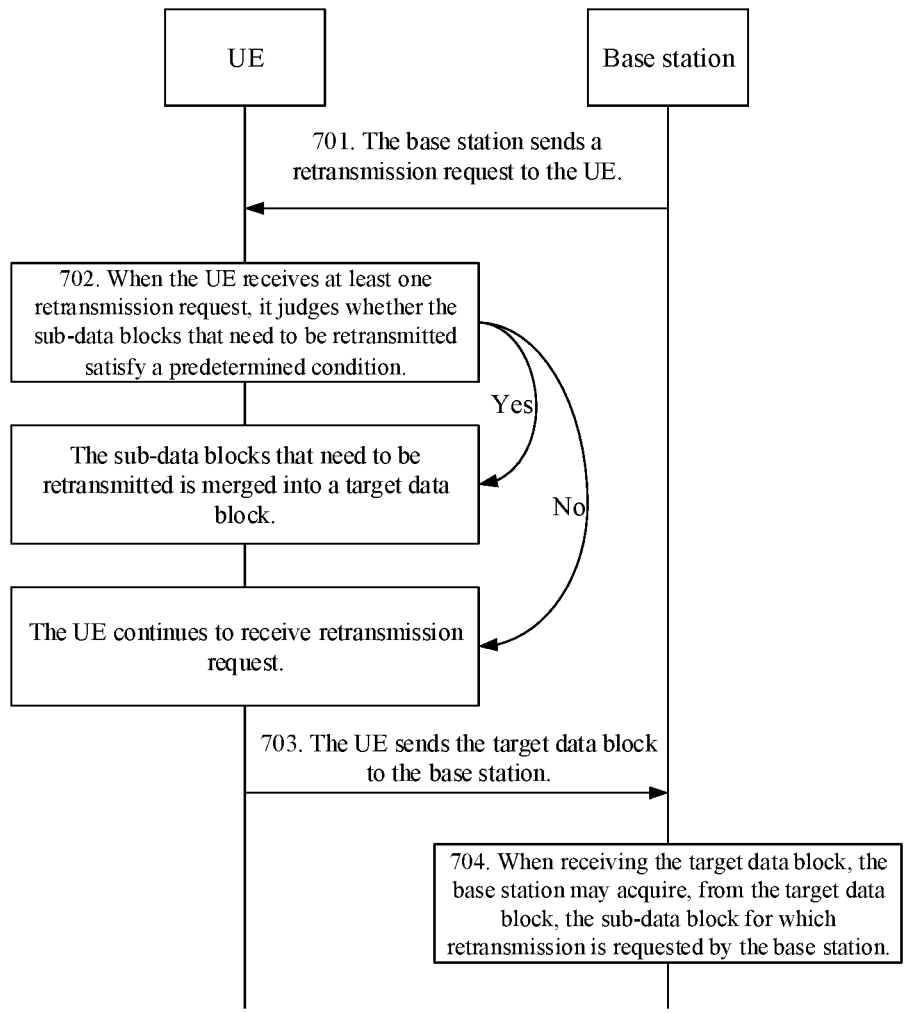
FIG. 7 is a flowchart of a method for transmitting data according to one or more embodiments of the present disclosure.

The embodiments as illustrated in FIG. 3 are described using a scenario where the UE requests data retransmission as an example. In a practical application scenario, it is likely that the base station requests data retransmission. For example, FIG. 7 schematically illustrates a method for transmitting data according to an exemplary embodiment. Referring to FIG. 7, the method is applied to interactions between the base station and the UE, and includes the following steps:

In step 701, the base station sends a retransmission request to the UE, wherein the retransmission request is used to request retransmission of the erroneous sub-data blocks in the previously transmitted data block.

This step is similar to step 301, which can be performed by replacing the UE with the base station and replacing the base station with the UE.

In step 702, when the UE receives at least one retransmission request, it determines whether the sub-data blocks that need to be retransmitted meet a predetermined condition; if yes, the sub-data blocks that need to be retransmitted are combined into a target data block; if no, the UE continues to receive retransmission request.

This step is similar to step 302, which can be performed by replacing the UE with the base station and replacing the base station with the UE. In addition, since the sub-data blocks that are combined may be desired by the base station in different services, the target data block may carry the sub-data block identifier of each sub-data block, such that the base station may effectively acquire, from the target data block, the sub-data blocks corresponding to each service.

It should be noted that the UE may also determine a configured retransmission mode after step 701. If the retransmission mode is the first retransmission mode, the UE sends the sub-data block corresponding to each retransmission request to the base station corresponding to the retransmission request; and if the retransmission mode is the second retransmission mode, step 702 is performed. Here, the configured retransmission mode for the UE is configured by the base station. The embodiments of the present disclosure set no limitation to the specific method for configuring the retransmission mode. For example, the retransmission mode may be configured by a PDCCH signaling, by an RRC signaling, or by a broadcast signaling. Taking the configuration by the PDCCH signaling as an example, the base station may schedule a downlink transmission resource for the UE by the PDCCH signaling, such that the UE may receive configuration indication information over the downlink transmission resource, and determine the configured retransmission mode based on the configuration indication information. By the above three methods for configuring the retransmission mode for the UE, the method for configuring the retransmission mode on the UE side is diversified, such that the base station may select a signaling with sufficient signaling resources to configure the retransmission mode based on the occupation of the current signaling resources. Alternatively, for improvement of the configuration efficiency, a signaling with a short transmission cycle may also be selected to configure the retransmission mode, for example, the PDCCH signaling.

The above retransmission process is similar to the retransmission process on the base station side based on the determined retransmission mode in the embodiments shown in FIG. 3, which may be performed by replacing the UE with the base station and replacing the base station with the UE. In addition, in a practical application scenario, the UE may also update the configured retransmission mode based on the configuration indication information sent by the base station in real time.

In step 703, the UE sends the target data block to the base station.

For example, the UE may send the target data block to the base station over a transmission resource that both the base station and the UE agree on. Here, the transmission resource may be agreed on in a plurality of ways. For example, the UE requests the base station to temporarily schedule a transmission resource for the UE prior to sending the target data block, such that the UE sends the target data block over the scheduled transmission resource; or the UE sends the target data block over a pre-configured transmission resource.

In a practical application scenario, considering that the sub-data block of each service type may have different size, therefore, in order to enable the UE to determine each sub-data block from the target data block, prior to sending the target data block, the UE may further send a scheduling request to the based station, wherein the scheduling request is used to request the base station to schedule an uplink transmission resource for the UE; and the UE sends transmission indication information to the base station over the uplink transmission resource, wherein the transmission indication information is used to indicate the number and size of sub-data blocks in the target data, so that the base station may determine each sub-data block from the target data block based on the transmission indication information, and acquire the sub-data block corresponding to each service types. Here, the base station may schedule the downlink transmission resource for the UE in a plurality of ways. For example, the downlink transmission resource may be scheduled by a PDCCH signaling, or by an RRC signaling, or by a broadcast signaling.

In step 704, when receiving the target data block, the base station may acquire, from the target data block, the sub-data block for which retransmission is requested by the base station.

For example, the base station may parse each sub-data block in the target data block based on parsing parameters that both the base station and the UE agree on when the UE accesses the base station, and verify the data parsed from each sub-data block. If the verification fails, it indicates that transmission of the erroneous sub-data blocks occurred, and a retransmission request for the sub-data blocks can be sent to the UE again. If the verification is successful, it indicates that the data block is the one for which retransmission is requested by the UE, and the UE acquires the data in the sub-data blocks. By the method of direct parsing, information such as the sub-data block identifier or the like does not need to be configured, such that the amount of data that needs to be transmitted is reduced, and the transmission load is mitigated.

Of course, the base station may also acquire the sub-data block based on the received transmission indication information. For example, the base station may determine the way to construct the sub-data blocks in the target data based on the number and size of the sub-data blocks indicated in the transmission indication information, and parse each determined sub-data block, such that when the sizes of the sub-data blocks of various service types are different, the base station may still successfully acquire the desired sub-data blocks.

In fact, in a case where each sub-data block included in the target data block carries the sub-data block identifier of the sub-data block, the base station may, based on the sub-data block identifier of the sub-data block corresponding to each service type for which retransmission is requested, directly acquire the sub-data block corresponding to the sub-data block identifier from the target data block. In this way, the efficiency of acquiring the sub-data block by the UE is improved.

According to the embodiments of the present disclosure, at least one retransmission request is received, and a target data block, after being combined with at the sub-data blocks, is sent to the second communication device if the sub-data blocks that need to be retransmitted meet a predetermined condition. Since the sub-data block has fewer data units compared with the data block, the erroneous data in the data block may be more accurately transmitted, and thus retransmission accuracy is improved. Meanwhile, the combined sub-data blocks are retransmitted in the form of the target data block, so that more data may be transmitted over an allocated transmission resource, not only the occupation of the transmission resources is saved, but also more data may be transmitted over the transmission resources at one time, thereby improving data transmission efficiency.

Figure 8A:
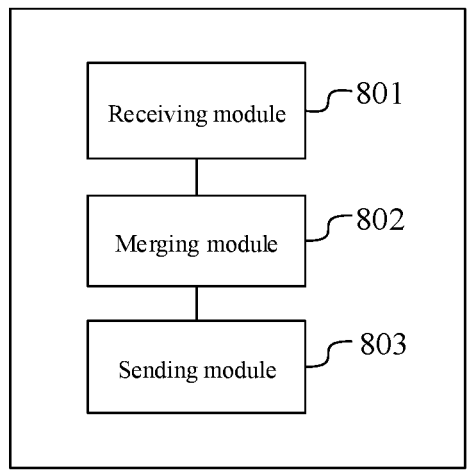
FIG. 8A is a block diagram of an apparatus for transmitting data according to one or more embodiments of the present disclosure.

FIG. 8A is a block diagram of an apparatus for transmitting data according to embodiments of the present disclosure. Referring to FIG. 8A, the apparatus includes: a receiving module 801, a combining module 802, and a sending module 803.

The receiving module 801 is configured to receive at least one retransmission request, wherein a retransmission request is used to request retransmission of the erroneous sub-data blocks in the previously transmitted data block.

The combining module 802 is configured to combine the sub-data blocks that need to be retransmitted into a target data block if the sub-data blocks that need to be retransmitted meet a predetermined condition.

The sending module 803 is configured to send the target data block to a second communication device.

According to the embodiments of the present disclosure, at least one retransmission request is received, and a target data block, after being combined with the sub-data blocks, is sent to a second communication device if the sub-data blocks that need to be retransmitted meets a predetermined condition. Since the sub-data block has fewer data units compared with the data block, the erroneous data in the data block may be more accurately transmitted, and thus retransmission accuracy is improved. Meanwhile, the combined sub-data blocks are retransmitted in the form of the target data block, so that more data may be transmitted over an allocated transmission resource, not only the occupation of the transmission resources is saved, but also more data may be transmitted over the transmission resources at one time, thereby improving data transmission efficiency.

In some embodiments, the combining module 802 is configured to, if the number of sub-data blocks that need to be transmitted reaches a first value, combine all these sub-data blocks to be transmitted into a target data block.

In some embodiments, if the number of sub-data blocks to be transmitted reaches the first value, the combining module 802 is configured to, based on the service type of each sub-data block that needs to be retransmitted, if the number of sub-data blocks whose service type is the target service type reaches a second value, combine all these sub-data blocks that need to be retransmitted into a target data block.

In some embodiments, the service type is URLLC, or eMBB, or mMTC.

In some embodiments, the target data block carries a sub-data block identifier of each sub-data block.

In some embodiments, the apparatus is applied to a base station, and the second communication device is a UE, and before the target data block is sent to the second communication device, the sending module 803 is further configured to send transmission indication information to the UE over a downlink transmission resource scheduled for the UE, wherein the transmission indication information is used to indicate the number and size of the sub-data blocks in the target data block.

In some embodiments, the apparatus is applied to a UE, the second communication device is a base station, and before the target data block is sent to the second communication device, the sending module 803 is further configured to send a scheduling request to the base station, wherein the scheduling request is used to request scheduling an uplink transmission resource for the UE; and send transmission indication information to the UE over the uplink transmission resource, wherein the transmission indication information is used to indicate the number and size of the sub-data blocks in the target data block.

Figure 8B:
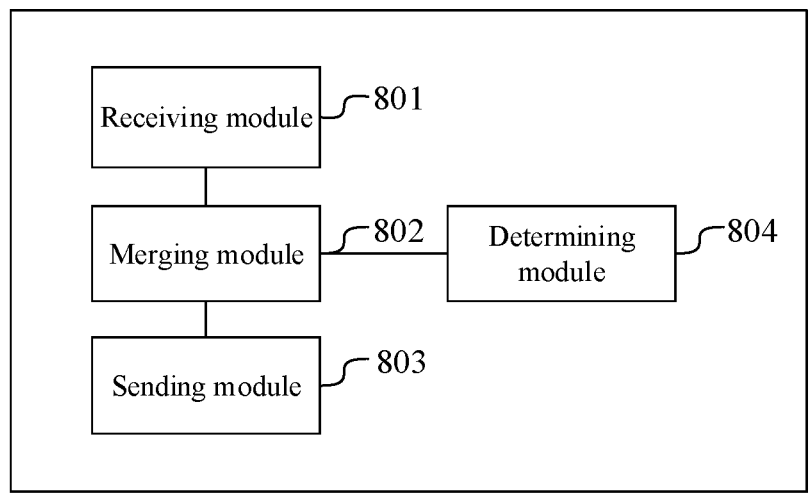
FIG. 8B is a block diagram of an apparatus for transmitting data according to one or more embodiments of the present disclosure.

In a possible implementation, based on composition of the apparatus as illustrated in FIG. 8A, referring to FIG. 8B, the apparatus further includes: a determining module 804, a sending module 803, and a combining module 802.

The determining module 804 is configured to determine a configured retransmission mode. The sending module 803 is further configured to send the sub-data block corresponding to each retransmission request to the second communication device corresponding to the retransmission request if the retransmission mode is the first transmission mode. The combining module 802 is further configured to combine the sub-data blocks that need to be retransmitted into a target data block if the retransmission mode is a second retransmission mode and the sub-data blocks that need to be retransmitted meet the predetermined condition.

In some embodiments, the apparatus is applied to a UE, the second communication device is a base station, the retransmission mode is configured by a PDCCH signaling, or the retransmission mode is configured by an RRC signaling, or the retransmission mode is configured by a broadcast signaling.

Any of the above optional technical solutions may be combined to form the optional embodiments of the present disclosure, which will not be described herein any further.

Figure 9:
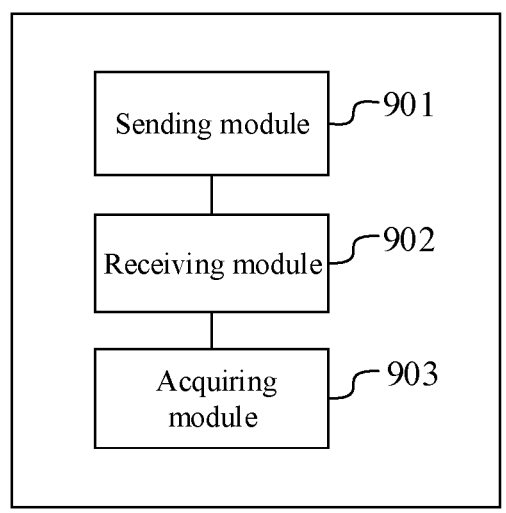
FIG. 9 is a block diagram of an apparatus for transmitting data according to one or more embodiments of the present disclosure.

FIG. 9 is a block diagram of an apparatus for transmitting data according to embodiments of the present disclosure. Referring to FIG. 9, the apparatus includes: a sending module 901, a receiving module 902 and an acquiring module 903.

The sending module 901 is configured to send a retransmission request to a first communication device, wherein the retransmission request is to request retransmission of a sub-data block that encounters an error in a previously transmitted data block.

The receiving module 902 is configured to receive a target data block, wherein the target data block is obtained by the first communication device combining the sub-data blocks that need to be retransmitted when the sub-data blocks that need to be retransmitted meet a predetermined condition.

The acquiring module 903 is configured to acquire the sub-data blocks, for which the second communication device requests retransmission, from the target data block.

According to the embodiments of the present disclosure, at least one retransmission request is received, and a target data block, after being combined with sub-data blocks, is sent to a second communication device if the sub-data blocks that need to be retransmitted meet a predetermined condition. Since the sub-data block has fewer data units compared with the data block, erroneous data in the data block may be more accurately transmitted, and thus retransmission accuracy is improved. Meanwhile, the combined sub-data blocks are retransmitted in the form of the target data block, so that more data may be transmitted over an allocated transmission resource, not only the occupation of the transmission resources is saved, but also more data may be transmitted over the transmission resources at one time, thereby improving data transmission efficiency.

It should be noted that, when the data transmission apparatuses transmit data shown in the above embodiments, they are described exemplarily only according to the division of each functional modules above. In a practical application, the above function assignment may be completed by different functional modules as needed. To be specific, the internal structure of the apparatus is divided into different functional modules to implement all or part of the above-described functions. In addition, the data transmission apparatus according to the above embodiments is based on the same inventive concept as the method for transmitting data according to the embodiments of the present invention. The specific implementation is elaborated in the method embodiments, which will not be detailed herein any further.

Figure 10:
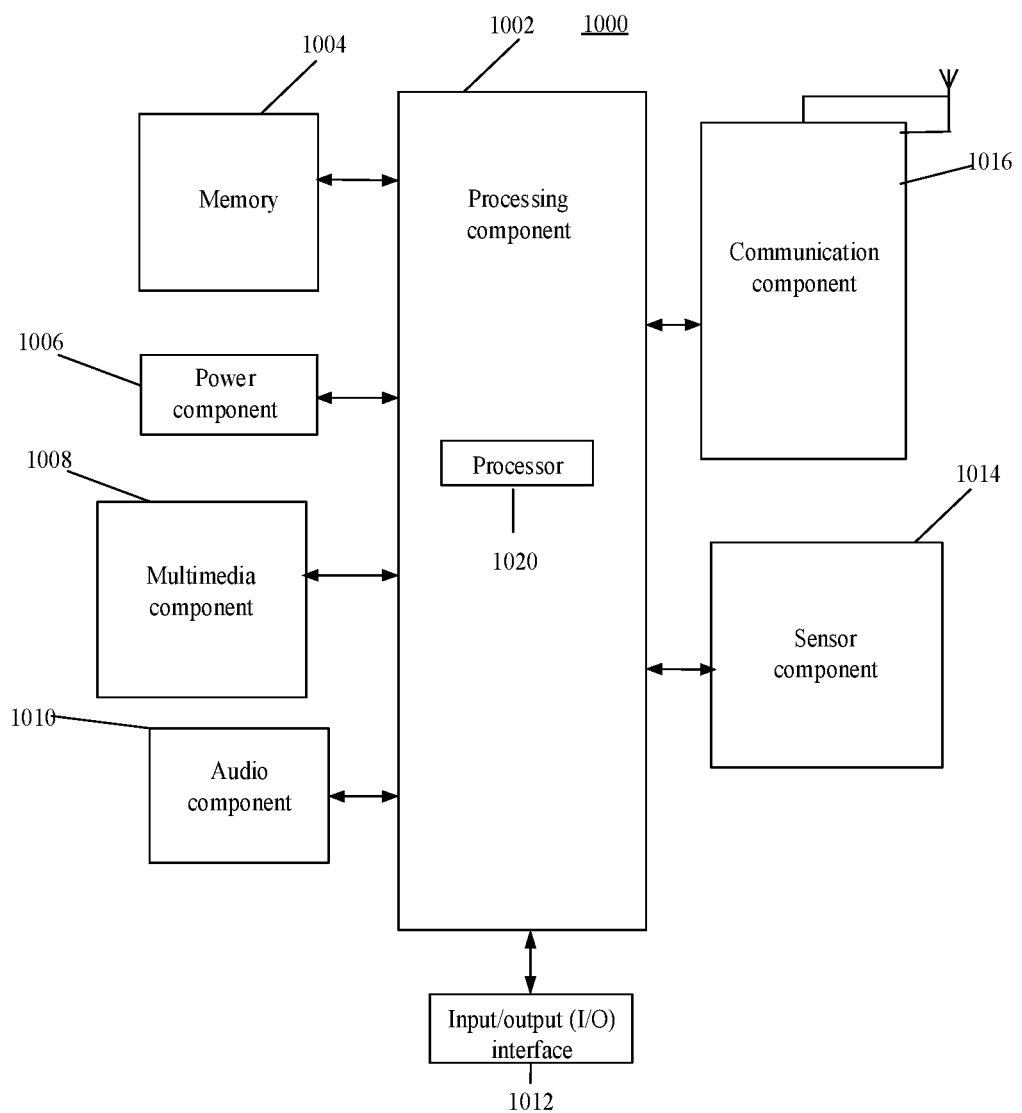
FIG. 10 is a block diagram of an apparatus 1000 for transmitting data according to one or more embodiments of the present disclosure.

FIG. 10 is a block diagram of an apparatus 1000 for transmitting data in accordance with an exemplary embodiment. For example, the apparatus 1000 may be a mobile phone, a computer, a digital broadcast terminal, a messaging device, a game console, a tablet device, a medical device, a fitness equipment, a personal digital assistant, and the like.

Referring to FIG. 10, the apparatus 1000 may include one or more of the following components: processing component 1002, memory 1004, power component 1006, multimedia component 1008, audio component 1010, input/output (I/O) interface 1012, sensor component 1014, and communication component 1016.

The processing component 1002 typically controls the overall operations of the apparatus 1000, such as the operations associated with display, telephone calls, data communications, camera operations, and recording operations. The processing component 1002 may include one or more processors 1020 to execute instructions to complete all or part of the steps in the above described methods. Moreover, the processing component 1002 may include one or more modules which facilitate the interaction between the processing component 1002 and other components. For instance, the processing component 1002 may include a multimedia module to facilitate the interaction between the multimedia component 1008 and the processing component 1002.

The memory 1004 is configured to store various types of data to support the operation of the apparatus 1000. Examples of such data include instructions for any applications or methods operated on the apparatus 1000, contact data, phonebook data, messages, pictures, videos, etc. The memory 1004 may be implemented by any type of volatile or non-volatile memory devices, or a combination thereof, such as static random access memory (SRAM), electrically erasable programmable read-only memory (EEPROM), erasable programmable read-only memory (EPROM), programmable read-only memory (PROM), read-only memory (ROM), magnetic memory, a flash memory, a magnetic, or optical disk.

The power component 1006 provides power to various components of the apparatus 1000. The power component 1006 may include a power management system, one or more power sources, and any other components associated with the generation, management, and distribution of power in the apparatus 1000.

The multimedia component 1008 includes a screen providing an output interface between the apparatus 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense the boundary of a touch or swipe action, but also detect the duration and pressure associated with the touch or swipe action. In some embodiments, the multimedia component 1008 includes a front camera and/or a rear camera. The front camera and the rear camera may receive external multimedia data while the apparatus 1000 is in an operation mode, such as a recording mode or a video mode. Each front camera and rear camera may be a fixed optical lens system or have focal length and optical zoom capability.

The audio component 1010 is configured to output and/or input audio signals. For example, the audio component 1010 includes a microphone (MIC) configured to receive external audio signals when the apparatus 1000 is in an operation mode, such as a call mode, a recording mode, and a voice recognition mode. The received audio signal may be further stored in the memory 1004 or transmitted via the communication component 1016. In some embodiments, the audio component 1010 further includes a speaker for outputting audio signals.

The I/O interface 1012 provides an interface between the processing component 1002 and peripheral interface modules, such as a keyboard, a click wheel, buttons, and the like. The buttons may include, but are not limited to, a home button, a volume button, a start button, and a lock button.

The sensor component 1014 includes one or more sensors to provide state assessments of various aspects of the apparatus 1000. For instance, the sensor component 1014 may detect an on/off state of the apparatus 1000, relative positioning of components, e.g., the display device and the mini keyboard of the apparatus 1000, and the sensor component 1014 may also detect a position change of the apparatus 1000 or a component of the apparatus 1000, presence or absence of user contact with the apparatus 1000, orientation or acceleration/deceleration of the apparatus 1000, and temperature change of the apparatus 1000. The sensor component 1014 may include a proximity sensor configured to detect the presence of nearby objects without any physical contact. The sensor component 1014 may also include a light sensor, such as a CMOS or CCD image sensor, used for imaging applications. In some embodiments, the sensor component 1014 may also include an accelerometer sensor, a gyroscope sensor, a magnetic sensor, a pressure sensor, or a temperature sensor.

The communication component 1016 is configured to facilitate wired or wireless communication between the apparatus 1000 and other devices. The apparatus 1000 can access a wireless network based on a communication standard, such as WiFi, 2G, or 3G, or a combination thereof. In an exemplary embodiment, the communication component 1016 receives broadcast signals or broadcast associated information from an external broadcast management system via a broadcast channel. In an exemplary embodiment, the communication component 1016 further includes a near field communication (NFC) module to facilitate short-range communications. In exemplary embodiments, the apparatus 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods performed by the UE.

In exemplary embodiments, a non-transitory computer-readable storage medium including instructions is also provided, such as the memory 1004 including instructions, wherein the instructions can be executed by the processor 1020 in the apparatus 1000 for performing the above-described methods. For example, the non-transitory computer-readable storage medium may be a ROM, a RAM, a CD-ROM, a magnetic tape, a floppy disc, an optical data storage device, and the like.

Figure 11:
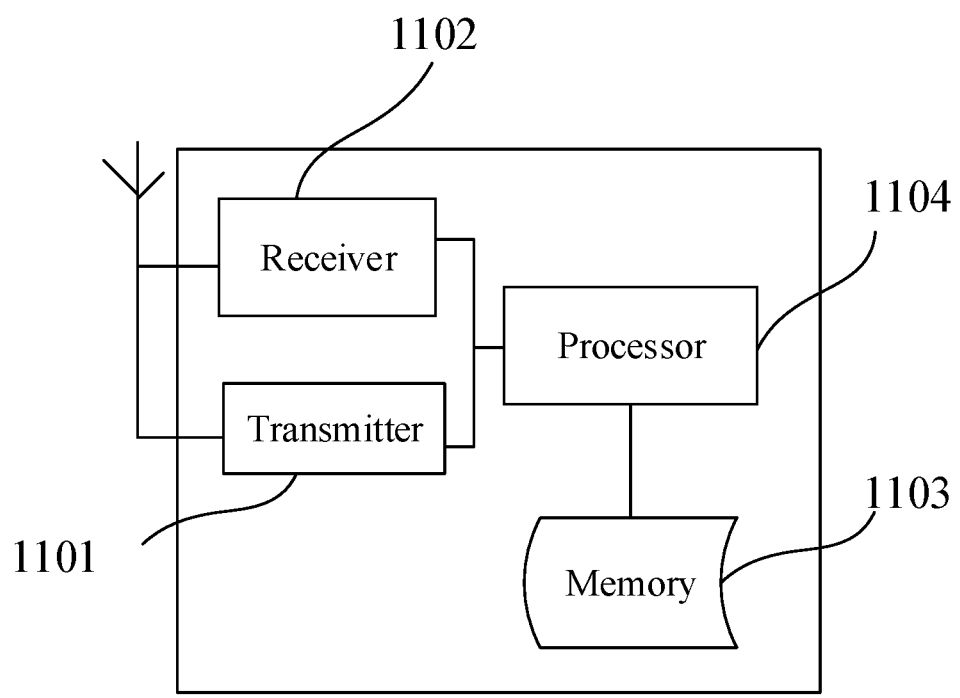
FIG. 11 is a block diagram of an apparatus for transmitting data according to one or more embodiments of the present disclosure.

FIG. 11 is a block diagram of an apparatus for transmitting data according to embodiments of the present disclosure. As illustrated in FIG. 11, the apparatus for transmitting data may be provided as a base station, and the base station includes: a transmitter 1101, a receiver 1102, a memory 1103, and a processor 1104 that is connected to the transmitter, the receiver, and the memory respectively. Of course, the base station may further include common components such as an antenna, a baseband processing component, a middle radio frequency processing component, an input and output device, and the like, which will not be limited in the embodiments of the present disclosure. The processor 1104 is configured to perform the method that may be practiced on the base station side in the above method embodiments.

In a first aspect, a method for transmitting data is provided. The method is applied to a first communication device, and the method includes:

receiving at least one retransmission request, each of the at least one retransmission request being to request retransmission of a sub-data block that encounters an error in a previously transmitted data block;

obtaining a target data block by combining the sub-data blocks that need to be retransmitted by combining the at least one sub-data block to be retransmitted when the at least one sub-data block to be retransmitted meets a predetermined condition; and sending the target data block to a second communication device.

According to the embodiments of the present disclosure, at least one a retransmission request is received, and a target data block obtained by combining at least one sub-data block is sent to a second communication device if the at least one sub-data block to be retransmitted meets a predetermined condition. Since the sub-data block is smaller relative to a data unit of a data block, erroneous data in the data block may be more accurately transmitted, such that the combined at least one sub-data block is retransmitted in the form of the target data block while retransmission accuracy is improved. In this way, more data may be transmitted over an allocated transmission resource, such that consumption of the transmission resources is saved, and in addition more data may be transmitted over the transmission resources, thereby improving data transmission efficiency.

In some embodiments, the obtaining a target data block by combining the sub-data blocks that need to be retransmitted by combining the at least one sub-data block to be retransmitted when the at least one sub-data block to be retransmitted meets a predetermined condition comprises:

when the number of sub-data blocks to be retransmitted reaches a first value, combining all these sub-data blocks to be retransmitted into a target data block.

In some embodiments, the combining the at least one sub-data block to be retransmitted into a target data block if the at least one sub-data block to be retransmitted meets a predetermined condition comprises:

based on a service type of each sub-data block to be retransmitted, if the number of sub-data blocks whose service type is a target service type reaches a second value, combining all these sub-data blocks to be retransmitted into a target data block.

In some embodiments, the service type is ultra reliable low latency communication (URLLC) or enhanced Mobile Broad Band (eMBB) or massive machine type communication (mMTC).

In some embodiments, the target data block carries a sub-data block identifier of each sub-data block.

In some embodiments, the first communication device is a base station, and the second communication device is a user equipment (UE), and prior to the sending the target data block to a second communication device, the method further comprises:

sending transmission indication information to the UE over a downlink transmission resource scheduled for the UE, the transmission indication information being to indicate the number of sub-data blocks in the target data block and sizes of the sub-data blocks.

In some embodiments, the first communication device is a user equipment (UE), and the second communication device is base station, and prior to the sending the target data block to a second communication device, the method further comprises:

sending a schedule request to the base station, the schedule request being to request scheduling an uplink transmission resource for the UE; and sending transmission indication information to the UE over the uplink transmission resource, the transmission indication information configured to indicate the number of sub-data blocks in the target data block and sizes of the sub-data blocks.

In some embodiments, upon the receiving at least one retransmission request, the method further comprises:

determining a configured retransmission mode;

sending the sub-data block corresponding to each retransmission request to the second communication device corresponding to the retransmission request if the retransmission mode is a first transmission mode; and the combining the at least one sub-data block to be retransmitted into a target data block if the at least one sub-data block to be retransmitted meets a predetermined condition comprises:

obtaining a target data block by combining the at least one sub-data block to be retransmitted, when the retransmission mode is a second retransmission mode and the at least one sub-data block to be retransmitted meets the predetermined condition.

In some embodiments, the first communication device is a user equipment (UE), and the second communication device is a base station, the retransmission mode is configured by a physical downlink control channel (PDCCH) signaling, or the retransmission mode is configured by a radio resource control (RRC) signaling, or the retransmission mode is configured by a broadcast signaling.

In a second aspect, there is provided a method for transmitting data, applied to a second communication device, the method comprising:

sending a retransmission request to a first communication device, the retransmission request being to request retransmission of a sub-data block that encounters an error in a previously transmitted data block;

receiving a target data block, the target data block being obtained by combining at least one sub-data block to be retransmitted when the at least one sub-data block of the first communication device meets a predetermined condition; and acquiring the at least one sub-data block for which the second communication device requests retransmission from the target data block.

In a third aspect, there is provided an apparatus for transmitting data, comprising:

a receiving module, configured to receive at least one retransmission request, each of the at least one retransmission request being to request retransmission of a sub-data block that encounters an error in a previously transmitted data block;

a combining module, configured to combine the at least one sub-data block to be retransmitted into a target data block when the at least one sub-data block to be retransmitted meets a predetermined condition; and a sending module, configured to send the target data block to a second communication device.

In some embodiments, the combining module is configured to:

when the number of sub-data blocks to be transmitted reaches a first value, combine all these sub-data blocks to be transmitted into a target data block.

In some embodiments, the combining module is configured to:

based on a service type of each sub-data block to be retransmitted, when the number of sub-data blocks whose service type is a target service type reaches a second value, combine all these sub-data blocks to be retransmitted into a target data block.

In some embodiments, the service type is ultra reliable low latency communication (URLLC) or enhanced Mobile Broad Band (eMBB) or massive machine type communication (mMTC).

In some embodiments, the target data block carries a sub-data block identifier of each sub-data block.

In some embodiments, the apparatus is applied to a base station, the second communication device is a user equipment (UE), and before the target data block is sent to the second communication device, the sending module is further configured to send transmission indication information to the UE over a downlink transmission resource scheduled for the UE, the transmission indication information being to indicate the number of sub-data blocks in the target data block and sizes of the sub-data blocks.

In some embodiments, the apparatus is applied to a user equipment (UE), the second communication device is a base station, and before the target data block is sent to the second communication device, the sending module is further configured to send a schedule request to the base station, the schedule request being to request scheduling an uplink transmission resource for the UE; and send transmission indication information to the UE over the uplink transmission resource, the transmission indication information being to indicate the number of sub-data blocks in the target data block and sizes of the sub-data blocks.

In some embodiments, the apparatus further comprises: a determining module. The determining module is configured to determine a configured retransmission mode. The sending module is further configured to send the sub-data block corresponding to each retransmission request to the second communication device corresponding to the retransmission request when the retransmission mode is a first transmission mode. The combining module is further configured to combine the at least one sub-data block to be retransmitted into a target data block when the retransmission mode is a second retransmission mode and the at least one sub-data block to be retransmitted meets the predetermined condition.

In some embodiments, the first communication device is a user equipment (UE), and the second communication device is a base station, the retransmission mode is configured by a physical downlink control channel (PDCCH) signaling, or the retransmission mode is configured by a radio resource control (RRC) signaling, or the retransmission mode is configured by a broadcast signaling.

In a fourth aspect, there is provided an apparatus for transmitting data, comprising:

a sending module, configured to send a retransmission request to a first communication device, the retransmission request being to request retransmission of a sub-data block that encounters an error in a previously transmitted data block;

a receiving module, configured to receive a target data block, the target data block being obtained by combining at least one sub-data block to be retransmitted when the at least one sub-data block of the first communication device meets a predetermined condition; and an acquiring module, configured to acquire the at least one sub-data block for which the second communication device requests retransmission from the target data block.

In a fifth aspect, there is provided an apparatus for use in transmitting data, comprising: a processor and a memory for storing instructions executable by the processor.

The processor is configured to: receive at least one retransmission request, each of the at least one retransmission request being to request retransmission of at least one sub-data block that encounters an error in a previously transmitted data block; combine the at least one sub-data block to be retransmitted into a target data block when the at least one sub-data block to be retransmitted meets a predetermined condition; and send the target data block to a second communication device.

In a sixth aspect, there is provided an apparatus for use in transmitting data, comprising: a processor and a memory for storing instructions executable by the processor.

The processor is configured to send a retransmission request to a first communication device, the retransmission request being to request retransmission of a sub-data block that encounters an error in a previously transmitted data block; receive a target data block, the target data block being obtained by combining at least one sub-data block to be retransmitted when the at least one sub-data block of the first communication device meets a predetermined condition; and acquire the at least one sub-data block for which the second communication device requests retransmission from the target data block.

According to the embodiments of the present disclosure, at least one retransmission request is received, and a target data block, after being combined with the sub-data blocks, is sent to a second communication device when the sub-data blocks that need to be retransmitted meet a predetermined condition. Since the sub-data block has fewer data units compared with the data block, erroneous data in the data block may be more accurately transmitted, and thus retransmission accuracy is improved. Meanwhile the combined sub-data blocks are retransmitted in the form of the target data so that more data may be transmitted over an allocated transmission resource, not only the occupation of the transmission resources is saved, but also more data may be transmitted over the transmission resources at one time, thereby improving data transmission efficiency.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for transmitting data, applied to a first communication device, comprising:
   receiving at least one retransmission request, wherein the retransmission request is configured to request retransmission of erroneous sub-data blocks in a previously transmitted data block, wherein each data block is a transport block (TB) carrying data transmitted in a data transmission process, and is constituted of sub-data blocks each being a code block group (CBG),
   obtaining a target data block by combining the sub-data blocks that need to be retransmitted; and
   sending the target data block to a second communication device,
   wherein obtaining a target data block by combining the sub-data blocks that need to be retransmitted comprises:
   obtaining the target data block by combining the sub-data blocks that need to be retransmitted based on a service type of each sub-data block that needs to be retransmitted, in response to:
   determining the transmission latency of a number of sub-data blocks whose service type is ultra reliable low latency communication (URLLC) reaches 1;
   determining the transmission latency of a number of sub-data blocks whose service type is enhanced Mobile Broad Band (eMBB) reaches 2; and
   determining the transmission latency of a number of sub-data blocks whose service type is massive machine type of communication (mMTC) reaches 4.

2. The method according to claim 1, wherein the target data block carries a sub-data block identifier of each sub-data block.

3. The method according to claim 1, wherein the first communication device is a base station, and the second communication device is a User Equipment (UE), and prior to the sending the target data block to the second communication device, the method further comprises:
   sending transmission indication information to the UE over a downlink transmission resource scheduled for the UE, the transmission indication information indicating a number of sub-data blocks in the target data block and a size of each sub-data block.

4. The method according to claim 1, wherein the first communication device is a user equipment (UE), and the second communication device is base station, and prior to the sending the target data block to a second communication device, the method further comprises:
   sending a scheduling request to the base station, wherein the scheduling request is configured to request scheduling an uplink transmission resource for the UE; and
   sending transmission indication information to the UE over the downlink transmission, wherein the transmission indication information is configured to indicate a number of sub-data blocks in the target data block and a size of each sub-data block.

5. The method according to claim 1, wherein after receiving at least one retransmission request, the method further comprises:
determining a retransmission mode configured; and
sending the sub-data blocks corresponding to each retransmission request to the second communication device corresponding to the retransmission request respectively when the retransmission mode is a first transmission mode,
wherein the combining the sub-data blocks that need to be retransmitted into a target data block, comprising:
combining the sub-data blocks that need to be retransmitted into a target data block when the retransmission mode is a second retransmission mode and the sub-data blocks that need to be retransmitted meet a predetermined condition.

6. The method according to claim 5, wherein the first communication device is a user equipment (UE), and the second communication device is a base station, the retransmission mode is configured by a physical downlink control channel (PDCCH) signaling, or the retransmission mode is configured by a radio resource control (RRC) signaling, or the retransmission mode is configured by a broadcast signaling.

7. An apparatus for transmitting data, comprising:
a processor, and
a memory for storing processor executable instructions;
wherein the processor is configured to:
receive at least one retransmission request, wherein a retransmission request is configured to request retransmission of erroneous sub-data blocks in a previously transmitted data block, wherein each data block is a transport block (TB) carrying data transmitted in a data transmission process, and is constituted of sub-data blocks each being a code block group (CBG); combine the sub-data blocks that need to be retransmitted into a target data block; and send the target data block to a second communication device,
wherein the processor is configured to combine the sub-data blocks that need to be retransmitted into a target data block comprises that the processor is further configured to:
obtain the target data block by combining the sub-data blocks that need to be retransmitted based on a service type of each sub-data block that needs to be retransmitted, in response to:
determining the transmission delay of a number of sub-data blocks whose service type is ultra reliable low latency communication (URLLC) reaches 1;
determining the transmission delay of a number of sub-data blocks whose service type is enhanced Mobile Broad Band (eMBB) reaches 2; and
determining the transmission delay of a number of sub-data blocks whose service type is massive machine type of communication (mMTC) reaches 4.

8. The apparatus according to claim 7, wherein the target data block carries a sub-data block identifier of each sub-data block.

9. The apparatus according to claim 7, wherein the apparatus is a base station, and the second communication device is a user equipment (UE), and the processor is further configured to:
prior to the sending the target data block to the second communication device, send transmission indication information to the UE over a downlink transmission resource scheduled for the UE, the transmission indication information indicating a number of sub-data blocks in the target data block and sizes of the sub-data blocks.

10. The apparatus according to claim 7, wherein the apparatus is a user equipment (UE), and the second communication device is base station, and the processor is further configured to:
prior to the sending the target data block to a second communication device, send a scheduling request to the base station, wherein the scheduling request is configured to request scheduling an uplink transmission resource for the UE; and
send transmission indication information to the UE over the downlink transmission, wherein the transmission indication information is configured to indicate a number of the sub-data blocks in the target data block and a size of each sub-data block.

11. The apparatus according to claim 7, wherein the processor is further configured to:
after receiving at least one retransmission request, determine a retransmission mode configured;
send the sub-data block corresponding to each retransmission request to the second communication device corresponding to the retransmission request when the retransmission mode is a first transmission mode.

12. The apparatus according to claim 7, wherein the processor is further configured to:
combine the sub-data blocks that need to be retransmitted into a target data block when a retransmission mode is a second retransmission mode and the sub-data blocks that need to be retransmitted meet a predetermined condition.

13. The apparatus according to claim 7, wherein the apparatus is a user equipment (UE), and the second communication device is a base station, a retransmission mode is configured by a physical downlink control channel (PDCCH) signaling, or the retransmission mode is configured by a radio resource control (RRC) signaling, or the retransmission mode is configured by a broadcast signaling.

14. An apparatus for transmitting data, comprising:
a processor; and
a memory for storing instructions executable by the processor;
wherein the processor is configured to: send a retransmission request to a first communication device, wherein the retransmission request is configured to request retransmission of erroneous blocks in a previously transmitted data block; receive a target data block, wherein the target data block is obtained by combining sub-data blocks that need to be retransmitted, wherein each data block is a transport block (TB) carrying data transmitted in a data transmission process, and is constituted of sub-data blocks each being a code block group (CBG); and acquire the sub-data blocks, which a second communication device requests to retransmit, from the target data block,
wherein the target data block is obtained by combining the sub-data blocks that need to be retransmitted based on a service type of each sub-data block that needs to be retransmitted, in response to:
determining the transmission delay of a number of sub-data blocks whose service type is ultra reliable low latency communication (URLLC) reaches 1;
determining the transmission delay of a number of sub-data blocks whose service type is enhanced Mobile Broad Band (eMBB) reaches 2; and determining the transmission delay of a number of sub-data blocks whose service type is massive machine type of communication (mMTC) reaches 4.

\* \* \* \* \*